Figure 1:
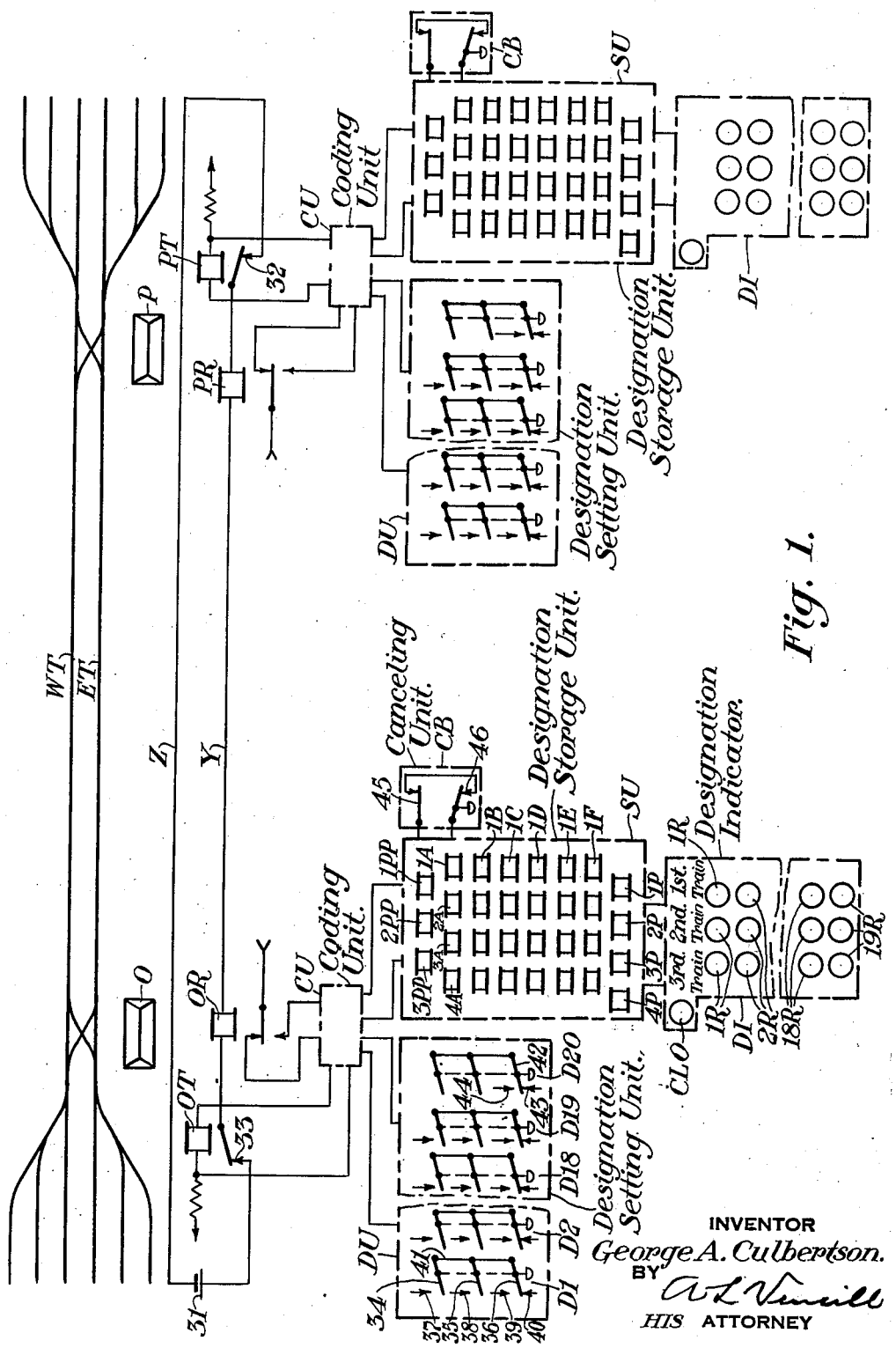

Patented Oct. 1, 1940

2,216,610

UNITED STATES PATENT OFFICE 2,216,610

SIGNALING SYSTEM

George A. Culbertson, Penn Township, Allegheny County, Pa., assignor to The Union Switch & Signal Company, Swissvale, Pa., a corporation of Pennsylvania Application August 31, 1937, Serial No. 161,782

10 Claims. (Cl. 177—353)

My invention relates to signaling systems, and particularly to systems for transmitting control signals from a sending station to a remote receiving station to indicate the particular character or designation of each of several successive events or objects.

A feature of my invention is the provision, in signaling systems of this character, of novel and improved apparatus for storing in the sequence in which received a plurality of different signals, and indicating the signals in the sequence in which they are stored. A further feature of the invention is the provision of apparatus of the type here involved which permits cancellation, either manually or automatically, of the storage and indication of such signals one at a time when the corresponding event is acted upon. When such cancellation takes place, the storage of the remaining signals progresses automatically so that a new signal can be received and stored, the storage being kept in the sequential order of the reception of the signals. With storage and indication apparatus as here provided, a relatively large number of signals can be stored simultaneously and if so desired only a few, say, for example, the first three signals indicated. When cancellation in response to an event being completed takes place and the storage progresses, the indication of the event completed is cancelled, the remaining indications progress and a new indication displaying the next stored signal is established. Still another feature of the invention is the provision of means whereby the sending operator can recall the last signal transmitted. An additional feature of my invention is the provision in systems of the type contemplated of apparatus which permits two-way sending and receiving between two remote stations over a single two-wire line circuit and with a return or answer-back indication effected when the sending of a control signal from either station is completed. A particular one of the stations is given priority and a control signal cannot be initiated at both stations simultaneously. When a control signal is initiated from either station, however, the other station is locked out. The apparatus checks against a wrong or incomplete signal.

The specific feature of the forms of my invention herein illustrated and described is the provision of apparatus for indicating the route to be taken by objects or vehicles successively approaching a junction for diverging routes, and wherewith the route designations of the successive objects are registered in advance at a station remote from the junction, are received one at a time at a station adjacent the junction and are stored in the order received, indications governed by said storage showing the number of objects approaching and the designation of such objects. The apparatus provides for cancellation of the storage and indication of the designation of each object when the object which it represents arrives at the junction. When a cancellation takes place, all the other stored designations and their respective indications progress automatically so that the indications will at all times show the designations of the objects approaching the junction in the order they are to arrive.

The invention is particularly useful for, although in no way limited to, train describer systems for railways, and is an improvement upon that disclosed in a copending application, Serial No. 85,544, filed June 16, 1936, for Remote control apparatus, by Ralph Mordin.

I shall describe one form of apparatus embodying my invention, and shall then point out the novel features thereof in claims.

Figure 2:
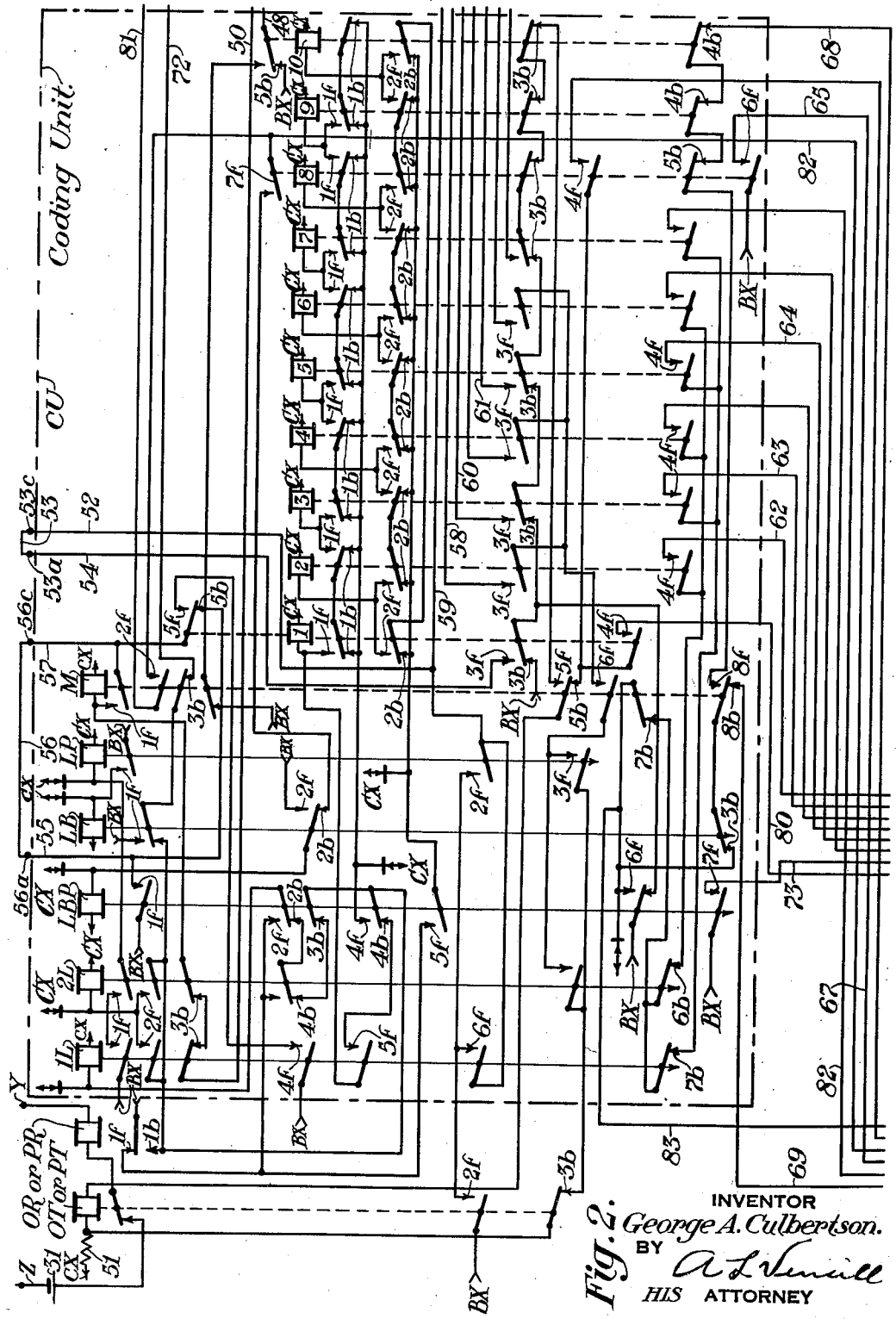
Figure 3:
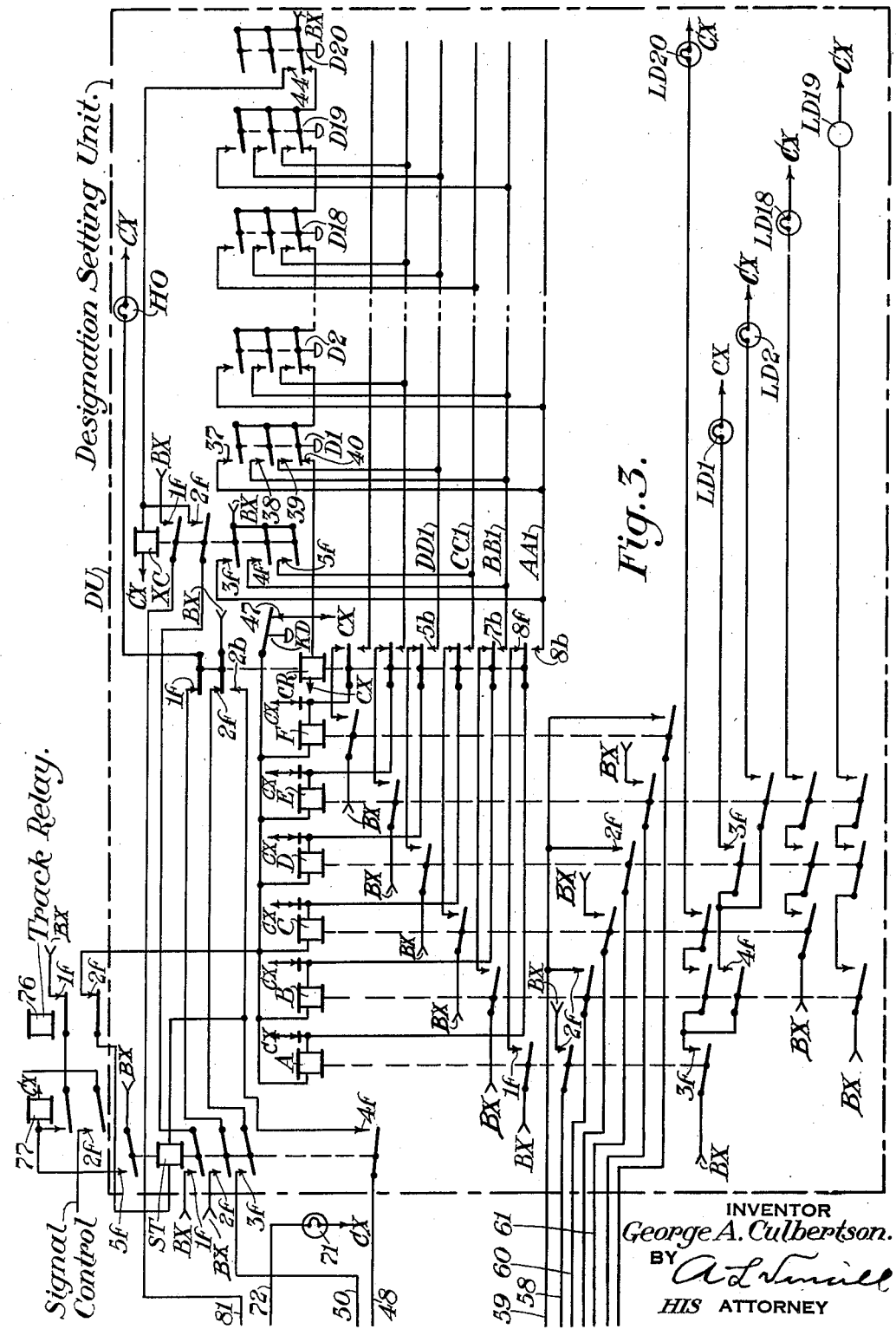
Figure 4:
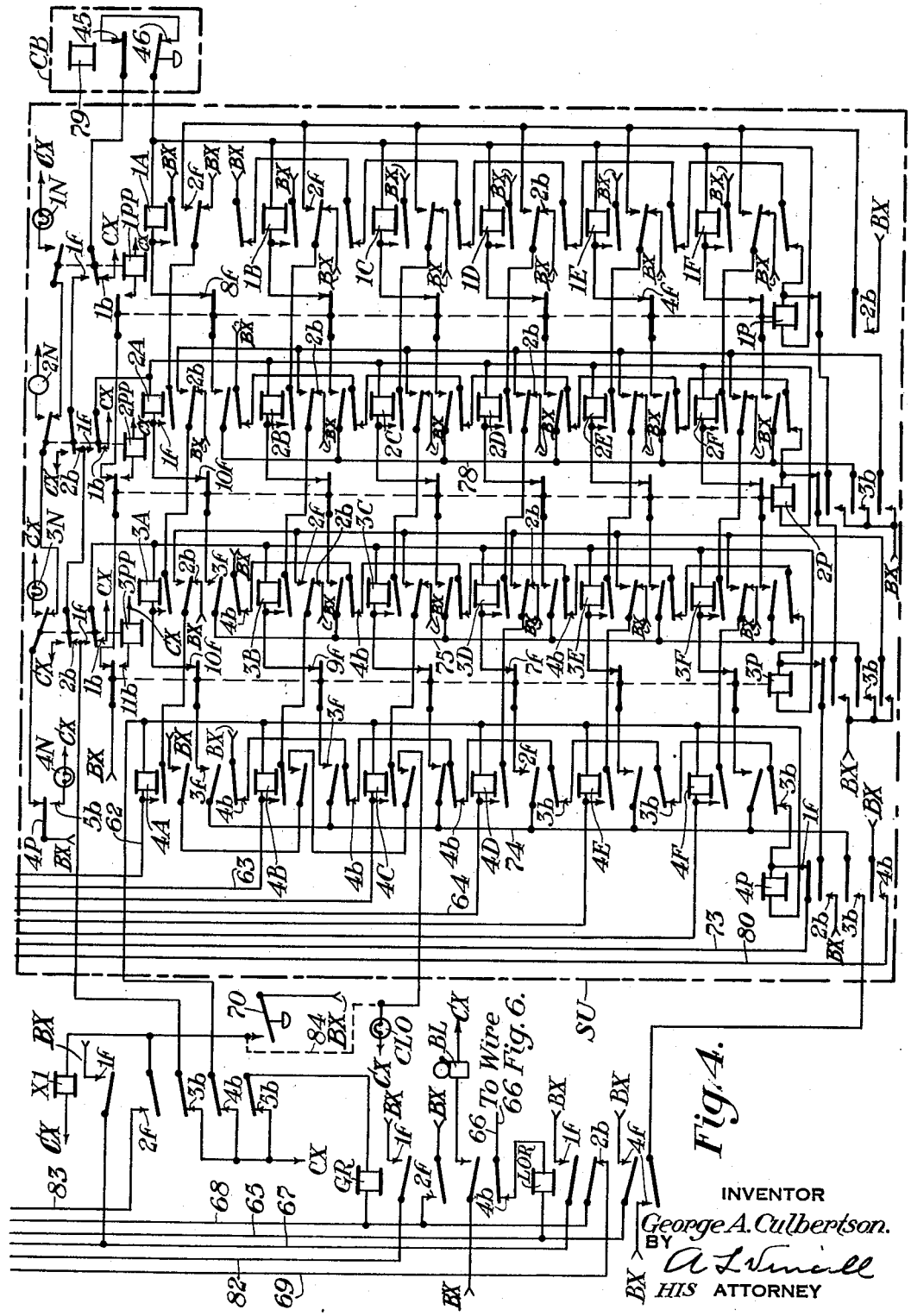
Figure 5:
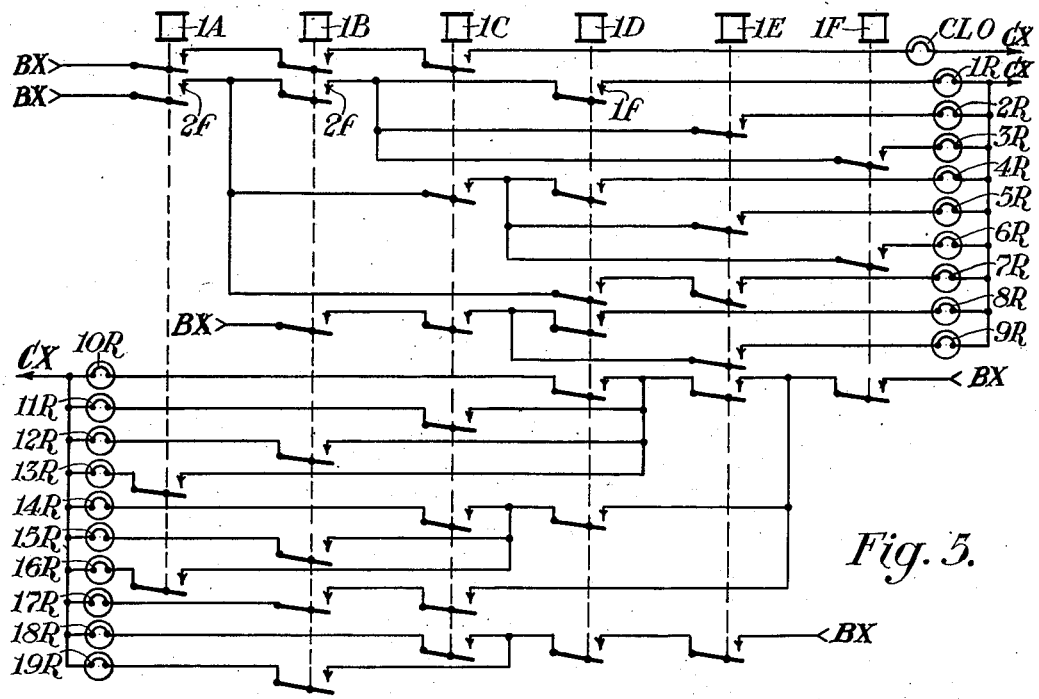
Figure 6:
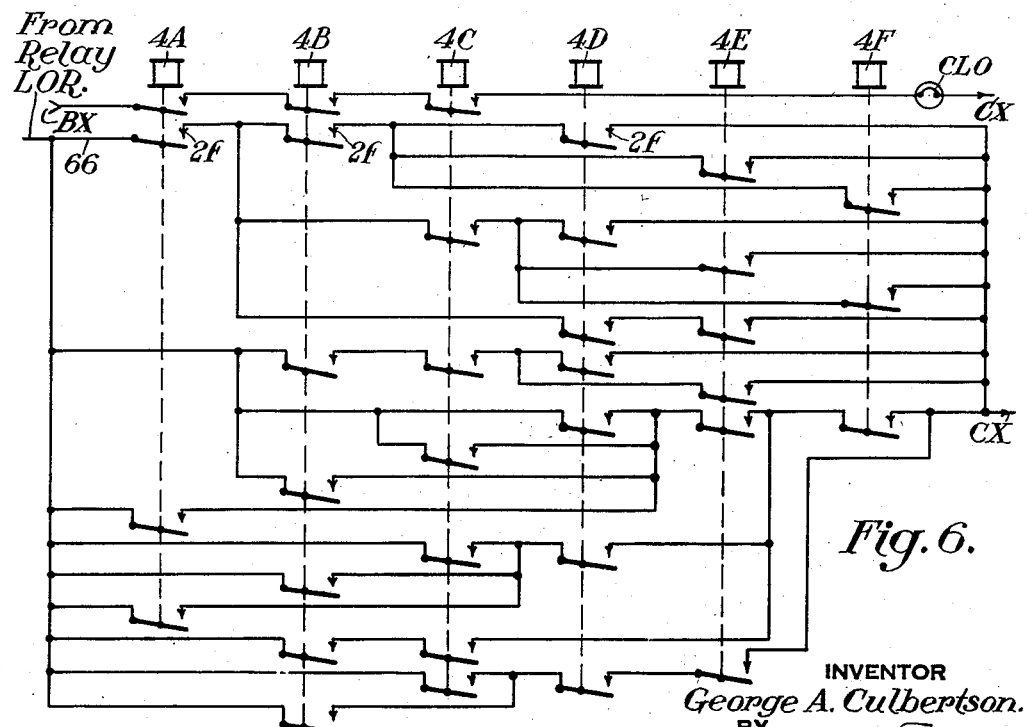

In the accompanying drawings, Fig. 1 is a diagrammatic view of apparatus embodying my invention for a train described system applied to a stretch of double track railway which terminates at each end in a relatively large number of diverging routes. Figs. 2, 3 and 4, taken together and arranged with Fig. 3 placed at the right-hand side of Fig. 2, and Fig. 4 placed below Fig. 2 with corresponding lines in alignment, are a diagrammatic view of one form of apparatus for a coding unit, designation setting unit, designation storage unit and a cancelling unit, as preferably provided in the system of Fig. 1, and which apparatus embodies my invention. Fig. 5 is a diagrammatic view of a preferred form of indicator light circuits controlled by a row of storage relays of the designation storage unit of Fig. 4. Fig. 6 is a diagrammatic view of a preferred form of circuits controlled by the last row of storage relays of the designation storage unit of Fig. 4 for governing a lockout relay.

In each of the several views, like reference characters designate similar parts.

Referring to Fig. 1, the reference characters ET and WT represent the eastbound and the westbound tracks, respectively, of a stretch of double track railway. At both the east or right-hand end and at the west or left-hand end of this stretch of railway, the tracks ET and WT diverge into different routes, as will be readily understood by an inspection of Fig. 1. While the tracks ET and WT are illustrated as diverging into six different routes, it will be understood the invention is not limited to this particular track layout and additional routes may be connected by providing the necessary track switches, or the track layout may be arranged for less than six diverging routes. As a matter of fact, the apparatus herein described and illustrated, would permit the tracks to diverge into nineteen different routes at each junction point.

Two stations or towers designated by the reference characters O and P are located one at each junction point of this stretch of railway. These stations or towers would, in accordance with usual practice, each have installed therein an interlocking machine by means of which an operator would control the switches and signals governing traffic over the different routes. Such interlocking machines and signals are not shown for the sake of simplicity, since they form no part of my present invention, and can be any one of the several types in present-day use.

To provide the operators at the stations O and P with information as to the designations and character of the trains moving over this stretch of railway, I provide stations O and P with apparatus for a signaling system embodying my invention. In the form of apparatus here disclosed, the operator at station O registers, as each eastbound train leaves his station, the route over which that train or vehicle is to proceed east from station P. This registration is transmitted to station P in the form of a code control signal, each route diverging from station P having a particular code. The code signal is received and stored at station P, and a visual indication corresponding to the route is displayed so that the operator at station P can set up the correct route when that particular train approaches the junction adjacent station P. Two or more eastbound trains may be spaced between stations O and P at the same time, and accordingly the designations or routes of the trains are sequentially stored and indicated in the order in which the trains approach station P. In order that a relatively large number of eastbound trains, say, for example, four, may be spaced between stations O and P at once, the designations of each train is stored, but the indications displayed are preferably the successive designations of the first three trains approaching, and another indication showing the total number of trains approaching is provided. When each eastbound train passes station P, cancellation takes place, either manually or automatically, of the storage and indication of the route of that train, and all other designations and indications progress automatically so that the visual indications show sequentially the routes of the trains in the order they are to arrive. In like manner, the operator at station P registers westbound trains leaving his station for storing and indicating at station O the routes the westbound trains are to take.

Different means may be used for transmitting the control signals between the two stations O and P, several systems being known to the art. To effect two-way transmission of such control signals over a single two-wire line circuit, I prefer to use the time code scheme disclosed and claimed in the application for Letters Patent of the United States Serial No. 600,786, filed March 23, 1932, by L. V. Lewis, for Remote control systems, which application corresponds with British Patent No. 415,787, issued Sept. 3, 1934. Such time code signaling system will be described in the instant application only in so far as is necessary for a full understanding of my invention, and reference is made to the aforementioned application Serial No. 600,786, or to the corresponding British Patent for a full understanding of such time code signaling. In general, the code control signals are transmitted by means of codes produced by repeatedly interrupting a line circuit connecting the two stations to form a series of code elements, distinctive character being given to the codes by making the several elements long or short in different patterns. Both the open and the closed periods of the line circuit are employed as code elements. As will appear hereinafter, in my invention the total number of elements employed in a single code signal is eight, each different code signal comprising a selected combination of short and long (closed and open periods) elements of eight consecutive elements. Furthermore, in my invention a return or indication code of a single element automatically follows the completion of each control signal. Certain checks, integral to the system, are provided to indicate if for any reason an incomplete code is received, if the line circuit opens due to a break in a line wire, or if for any reason the apparatus fails to function properly.

The line circuit serially includes the winding of two line relays one at each station, and which relays are designated by the reference character R plus a prefiix corresponding to the station. The opened and closed conditions of the line circuit are governed by two transmitter relays one at each station which are designated by the reference character T plus a prefix corresponding to the station. Looking at Fig. 1, this line circuit can be traced from one terminal of a battery 31 over line wire Z extending between stations O and P, back contact 32 of a transmitted relay PT at station P, winding of a line relay PR, line wire Y extending between the two stations, winding of a line relay OR at station O, back contact 33 of a transmitter relay OT, and to the other terminal of battery 31. It follows that normally this line circuit is closed and the two line relays OR and PR are energized and picked up, but that operation of the transmitter relay at either station opens the line circuit and causes the two line relays to be deenergized and released. Hence, long and short code elements can be effected by operating either one of the two transmitter relays OT or PT to open and close the line circuit for long and short periods. Such code elements are reflected at each station by a corresponding operation of the associated line relay, the two line relays operating in step with each other.

The stations O and P are each provided with appartus for operating the associated transmitter relay for sending a code signal and for decoding, storing and indicating a code signal when the associated line relay is operated in response to a code signal sent from the other station. This apparatus provided at each station involves the following devices or units, a coding unit CU, a designation setting unit DU, a designation storage unit SU, a designation indicator DI and a cancelling unit CB. Each station is also provided with checking and lockout apparatus, to be referred to hereinafter, as well as with the necessary sources of current. The apparatuses at the two stations are substantially alike, and a description of the apparatus for one station will suffice for an understanding of the apparatus of both stations.

To clarify the description, I shall assume that four trains are to be spaced on either track ET or WT between the stations O and P and that there are nineteen different diverging routes at each junction point. In other words, each eastbound train leaving station O may move east from station P over any one of nineteen routes, and as many as four eastbound trains may be spaced between stations O and P simultaneously. While four trains may be spaced between the two stations simultaneously, the routes of the first three trains only are indicated. A similar traffic condition exists, of course, for westbound trains. In addition to the nineteen different designations one for each of the nineteen different routes, a twentieth or special designation of "cancel-last-designation" is provided.

Referring to the designation setting unit DU at station O and looking first at Fig. 1, the unit includes a series of control levers, here shown as push buttons, one for each designation to be established. On the assumption there are nineteen different routes diverging from the junction adjacent station P, to which routes I shall refer to by the reference characters IR to 19R, inclusive, and a twentieth special designation of "cancel-last-designation," the unit DU is provided with twenty push buttons numbered D1 to D20, inclusive, to correspond with the routes IR to 19R, inclusive, and the twentieth special designation. In Fig. 1, only the first two push buttons D1 and D2 and the last three D18, D19 and D20 are shown for the sake of simplicity. These push buttons are all alike and are preferably of the spring return type biased to a normal position, that is to the position illustrated in the drawings. Taking push button D1, for example, three contact fingers 34, 35 and 36 are operated thereby and are adaptable of engaging three stationary contacts 37, 38 and 39, respectively, when the push button is actuated. The contact finger 36 is arranged to also engage a stationary contact 40 when the push button is released and returns to its normal position. The heels of the three contact fingers are tied together by a connector 41. The rest of the push buttons are of the same construction, except push button D20, where one contact finger only is used. The contact finger 42 of push button 20 normally engages a stationary contact 43 and engages another contact 44 when the push button is actuated.

Referring to Fig. 3 as well as to Fig. 1, the unit DU includes a check relay CR, a starting relay ST, a special relay XC, and a series of six code setting relays A to F, inclusive.

Before proceeding in the discussion of an arrangement of the various relays, it should be pointed out that for the purpose of designating relay contacts I have employed lower case letters, the reference characters b and f designating back and front contacts, respectively. To distinguish between the different front and back contacts of an individual relay, numerals 1, 2, etc., are added to the letters b and f.

When the push buttons D1 to D20 are all in the normal position, the check relay CR is, as will be readily understood by an inspection of Fig. 3, energized over a simple circuit serially including the normally closed contact of each push button as well as a current source, the two terminals of which are designated by the reference characters BX and CX. If the operator at station O desires to register an eastbound train moving to the route IR at station P, he would actuate the push button D1, holding it in its raised position for a moment and then releasing it to allow it to return to its normal position. When the push button D1 is raised and its contact 40 opened, the check relay CR is deenergized and released. Closing of contacts 37, 38 and 39 when the push button D1 is raised supplies positive energy from the BX terminal of the current source to each of the bus wires AA1, BB1 and DD1, and current flows from the bus wire AA1 over back contact 8b of relay CR, winding of relay A, contact 47 of a knockdown push button KD, to be referred to later, and to the CX terminal of the current source, and relay A is picked up. Current also flows from the bus wire BB1 over back contact 7b of relay CR, winding of relay B, contact 47 of push button KD, and to the CX terminal, and relay B is picked up. Likewise, current flows from the bus wire DD1 over back contact 5b of relay CR, winding of relay D, contact 47 and to the CX terminal, and relay D is picked up. When the push button D1 is released and contact 40 closed, the relay CR is reenergized and picked up. The relays A, B and D are retained energized over stick circuits provided one for each of the code setting relays. For example, the stick circuit for relay A includes BX terminal, its own front contact 1f, front contact 8f of relay CR, winding of relay A, contact 47 and terminal CX. The stick circuits for the relays B and D are in each case similar to that just described for relay A and need not be traced. When relay CR is released, closing its back contact 2b, the starting relay ST is provided with a pick-up circuit including BX terminal, back contact 2b of relay CR, winding of relay ST, front contact 2f of a relay 76 to be referred to later, contact 47 and terminal CX. When relay CR is reenergized in response to release of the push button D1, the starting relay ST is retained picked up over a stick circuit extending from terminal BX, back contact 5b of a relay 10 to be referred to later (see Fig. 2), wire 48, front contact 4f and winding of relay ST, and thence as previously traced. It follows that operation of the push button D1 results in the three code setting relays A, B and D being picked up, as well as the starting relay ST. It is to be noted that operation of the knockdown push button KD to open contact 47 subsequent to such operation of the push button D1 is effective to cause the release of the code setting relays A, B and D and the starting relay ST. An analysis of Fig. 3 will disclose that operation of any one of the other push buttons D2, D18 or D19 results in each case in a particular group of three of the code setting relays A to F, inclusive, being picked up along with the starting relay ST. Operation of a push button and the release of the relay CR are effective to clear out the previously energized code setting relays before a new group is selected. In like manner, operation of any one of the push buttons D3 to D17 (not shown) selects a distinctive group of three of the code setting relays. In the case of push button D20 which corresponds to the special designation "cancel-last-designation", the relay XC is energized and picked up in response to operation of the push button D20 to close its contact 44. Relay XC, on picking up, closing its front contacts 3f, 4f and 5f, connects the positive terminal BX to the bus wires AA1, BB1 and CC1, and the code setting relays A, B and C are selected. The starting relay ST is operated in response to operation of push button D20, the same as when any of the other push buttons is actuated, and relay ST, when picked up, closing its front contact 1f, completes a stick circuit for holding the relay XC energized. As will shortly appear, the starting relay ST governs the sending of the code signal, and the code setting relays determine the pattern of the code signal, the second to the seventh code elements being made long or short elements according to which of the code setting relays A to F, inclusive, are energized or deenergized.

It is to be noted from Fig. 3 that each push button D1 to D20 is provided with a telltale or check lamp designated by the reference character L plus the reference character of the corresponding push button, and these lamps are each provided with a circuit which serially includes front contacts of the three code setting relays selected when the same push button is actuated. Looking at lamp LD1 for push button D1, for example, a circuit can be traced from the BX terminal over front contact 3f of relay A, front contact 4f of relay B, front contact 3f of relay D, lamp LD1 and to the CX terminal. The other lamps are each provided with similar circuits. These lamps are mounted to be readily visible to the operator, and hence the operator at station O can tell which one of the push buttons was last operated.

The unit DU also includes a "hands off" lamp HO which is provided with a simple circuit including the front contact 2f of relay ST and the front contact 1f of the relay CR. It follows that when the relay ST is picked up to effect the sending of a code signal in response to operation of one of the push buttons the lamp HO is illuminated until the code is completed and the relay ST is deenergized in a manner to later appear.

The coding unit CU for station O includes a chain of relays (see Fig. 2) designated 1 to 10, inclusive; a group of slow acting relays 1L, 2L, LB, LP and LBP; and a master relay M. The function of these several relays of the coding unit are similar to the function of relays identified by similar reference characters in the aforementioned application Serial No. 600,786, and in the corresponding British Patent No. 415,787. In the chain of relays, the relays 1 to 8 are operated consecutively during the sending of a code signal to govern the slow acting relays in accordance with the setting of the code setting relays A to F of the designation unit DU, the control of the slow acting relays being that required to produce a desired pattern of long and short elements of the code signal. The relays 1 to 8 operate also in sequence during the reception of a code signal at station O to register the pattern of the incoming code in the storage unit SU, to be described later. Relays 9 and 10 of the chain of relays are provided to effect the sending of the return or indication code element at the end of the reception of a code signal. Relays 1L and 2L are employed to effect respectively the odd numbered and the even numbered long code elements when station O is sending and to register the long code elements when station O is receiving. Relay LP is a repeater of relays 1L and 2L and functions to terminate each long code element. Relay LB and its repeater relay LBP are "bridging relays" which are adjusted so that the relay LBP remains picked up for a period greater than a long code element and are provided for the purpose of maintaining holding circuits closed during a code signal and to open such circuits at the end of the signal. Master relay M acts as a selecting relay and is maintained energized when station O is transmitting and remains deenergized when station O is receiving.

The circuits for the coding unit CU include a number of asymmetric units shown conventionally. Each asymmetric unit is so connected in circuit as to provide a high resistance to the flow of current from the power source and at the same time provide a low resistance path including a winding of one or more of the relays through which the relay current may continue to flow after the power source is disconnected, with the result that the associated relays are provided with slow release characteristics in the well-known manner. The manner wherein the relays of the coding unit CU at station O function to operate the associated transmitter relay OT in sending a code signal, and are controlled by the associated line relay OR in the receiving of a code signal at station O, will appear when the operation of the system is described.

In order to store any one of twenty separate designations and to provide the simultaneous storing of the designation of four separate trains, I provide the designation storage unit SU at station O with four rows of relays, with each row of relays consisting of six storage relays, and each designation is represented by a group of three relays. All three relays of a group must be picked up to produce an indication corresponding to the designation. It can be shown that a row of six relays can be arranged into a maximum of twenty different groups of three relays. Thus, with six relays provided for each row of storage relays of unit SU, a separate group of three relays can be assigned to each of the twenty different designations. Proper selection of the relays assigned to a particular designation is assured by requiring the three relays of the group to be all picked up to effect the display of the signal corresponding to that designation. With four rows of such storage relays, then the designations of four different trains can be stored simultaneously. In the event the designations of more than four trains are to be stored at a time, additional rows of six relays each would be provided in the storage unit SU. If less than twenty separate designations are required, each relay row may include less than six relays. Again, if a larger number of designations than twenty is required, then each relay row would be provided with more than six relays, and each designation would be represented by a group of a predetermined number of the relays all of which must be picked up to produce an indication. Hence, apparatus embodying my invention is susceptible of application to many different arrangements of track layout and traffic conditions.

Looking at Figs. 1 and 4, the storage relays of each row of the unit SU are designated by the reference characters A to F, inclusive, with a number added to designate the row. That is, relays 1A to 1F, inclusive, constitute the first row, relays 2A to 2F, inclusive, the second row, relays 3A to 3F, inclusive, the third row, and relays 4A to 4F, inclusive, the fourth and last row. Looking at the storage unit SU in another way, the relays are arranged in six series of relays with each series consisting of four relays. For example, the first series would include the A relays, of which series relay 1A is the first relay and 4A is the last relay.

A series of transfer relays 1P, 2P, 3P and 4P is associated with the storage relays for governing progressive energization of the relays from one row to the next, transfer relay 1P being associated with the first row, transfer relay 2P being associated with the second row, etc. That the last designation stored may, at times, be cancelled, a second series of transfer or repeater relays is provided, one for each row of storage relays, except the last row. That is, transfer relays 1PP, 2PP and 3PP are associated with the first, second and third rows of storage relays, respectively.

A lockout relay LOR, a relay GR and a bell BL are associated with the storage unit SU to check and sound a warning of the reception of an incomplete code signal, to initiate the return indication code element and to provide a definite locking of the line circuit when the twentieth designation "cancel-last-designation" is effected. The storage unit SU is also provided with a relay X1 and a series of lamps, one for each row of storage relays, which lamps are designated N with a prefix corresponding to the storage row. The lamps 1N to 4N are illuminated when the designation stored in the respective row of storage relays is the last designation received, and hence these lamps indicate to the operator the total number of trains approaching his station.

Looking at Fig. 1, the designation indicator DI of station O comprises three vertical rows of lamps, since the designations of three trains are to be displayed simultaneously. Each row of lamps consists of nineteen lamps, since there are nineteen different diverging routes at the junction point. Beginning at the top, the lamps of each row are preferably marked 1R, 2R, etc., to 19R, to correspond one for each of the nineteen different routes. The row of lamps at the right is governed by the first row of storage relays and is used to indicate the route for the first train. The center row of lamps is controlled by the second row of storage relays and is used to indicate the route of the second approaching train, and the row of lamps to the left is governed by the third row of storage relays and is used to indicate the route of the third approaching train. The lamps would have stenciled thereon, or otherwise marked, the corresponding route number so that when the lamp is illuminated the route for the train is clearly displayed to the operator. In Fig. 1, only the first two lamps 1R and 2R and the last two lamps 18R and 19R of each row are shown for the sake of simplicity. A lamp CLO is provided for indicator DI for displaying the twentieth special designation "cancel-last-designation."

In Fig. 5, circuits are shown which are controlled by the first row of storage relays 1A to 1F, inclusive, for illuminating the lamps 1R to 19R, inclusive, of the first row of lamps of indicator DI. These circuits are readily understood from an inspection of Fig. 5 and a detailed description thereof is unnecessary. It is to be noted that the circuit of each lamp serially includes a front contact of each of a group of three relays with a different group for each lamp. The second row of storage relays governs a similar set of circuits for illuminating the lamps of the second row, and likewise the circuits controlled by the third row of storage relays for illuminating the third row of lamps are similar to the circuits of Fig. 5. It is to be observed from Fig. 5 that relays 1A, 1B and 1C govern the circuit for the lamp CLO. In a like manner, the A, B and C relays of the second, third and fourth rows of storage relays control a circuit for the lamp CLO. As shown in Fig. 6, the relays 4A to 4F of the last storage row of relays govern circuits for the lockout relay LOR, the circuits of Fig. 6 being similar to the lamp circuits of Fig. 5.

The cancelling unit CB of station O (see Fig. 1) includes two circuit controlling contacts 45 and 46. The contact 45 would be controlled by westbound trains passing station O. That is, contact 45 may be governed by a track relay responsive to trains on the westbound track WT. The contact 46 is controlled manually by a common push button. The manner whereby the contacts 45 and 46, when operated, are effective to cancel designation stored in the storage unit SU will appear hereinafter.

As set forth hereinbefore, the apparatus installed at station P is substantially the same as that described for station O.

In describing the operation of the apparatus, I shall first take up the operating steps effected in sending a code signal from station O. It is to be recalled that a code signal in the form of my invention here illustrated consists of eight consecutive code elements, of which the second to the seventh elements are made long or short according to the setting of the code setting relays A to F of the designation setting unit DU. The first code element of a code signal sent from station O is preferably made long, whereas the first element of a code signal sent from station P is made short, in order to give station O priority in the event both operators attempt to initiate a code signal simultaneously. The eighth code element functions to terminate the sending of a code signal and to condition the relays at the sending station as required for reception of a return indication code element.

In describing the operation of sending a code signal from station O, I shall take by way of illustration the steps that follow when the operator registers an east-bound train that is to move to the route 1R at station P. Referring to Figs. 2 and 3, the relays at the start are all in their normal positions, that is, in the positions illustrated in the drawings. To register the train, the operator at station O actuates the push button D1, and the relays A, B and D, as well as the starting relay ST, of the unit DU are picked up in the manner described hereinbefore. Under these circumstances, a circuit can be traced from the BX terminal over front contact 2f of relay CR, front contact 3f of relay ST, wire 50, back contact 3b of relay 1L, back contact 3b of relay 2L, winding of relay M and to the CX terminal, and the relay M is picked up to select the circuits as required for sending code signals from station O. With relay M picked up, the transmitter relay OT is provided with a pick-up circuit extending from the BX terminal over back contacts 3b of each of the relays 1, 3, 5, 7, 8, 9 and 10, front contact 5f of relay M, winding of relay OT, resistance 51 and to the CX terminal, and this circuit is now closed so that the relay OT is picked up to open the line circuit and thus cause operation of the line relays at both stations O and P. The operation of line relay PR at station P is for the purpose of receiving the code signal sent from station O, as will be described later, and its operation will not be further considered in describing the operating steps for sending a code signal from station O. When the line relay OR is released, a circuit is completed from the BX terminal over back contact 1b of relay OR, back contact 3b of relay LBP, back contact 4b of relay 2L, back contact 2b of relay LBP, winding of relay 1L and terminal CX, and relay 1L is picked up. The picking up of relay 1L is followed by current being supplied from BX terminal over back contact 1b of relay OR, front contact 2f of relay IL, winding of relay 2L and terminal CX, and relay 2L is picked up. Relay 2L is then retained energized over a stick circuit that includes its own front contact 2f and the back contact 1b of relay OR. Relay IL is now deenergized and releases at the end of its slow release period, which is preferably of the order of one-fifth of a second. During the interval that both relays IL and 2L are picked up, the relay LP is energized over a circuit including the front contact 1f of each of the relays IL and 2L. With relay LP picked up, the relay LB is energized over the front contact 1f of relay LP, and the relay LBP is then energized in turn over the front contact 2f of the relay LB. The relay LP is provided with a slow release period as required to produce the long elements of the code, which are measured by the successive release of relays LI and LP or of relays L2 and LP, and therefore are somewhat longer than one-fifth second, the release period of relays IL and 2L. The relays LB and LBP are provided with slow release periods of such duration that relay LBP remains energized during the entire sending of the code signal.

When the relay IL is picked up in response to release of relay OR, the relay I of the chain of relays is energized over a pick-up circuit including BX terminal, back contact 1b of relay OR, back contact 4b of relay LBP, front contact 5f of relay IL, winding of relay I and to terminal CX. When relay LBP is picked up, a stick circuit for relay I is closed which includes front contact 4f of relay LBP, back contact 1b of relay 2, front contact 1f and winding of relay I and to CX terminal.

Relay M is retained energized during the entire time of sending a code signal and to that end it is provided with stick circuits one of which includes front contact 4f of relay IL and front contact 5f of relay I. With relay LBP picked up, a stick circuit for relay M is formed at front contact 1f of relay LBP and back contact 5b of relay I. To retain relay M energized during the sending of a long first code element, a connector 56 is provided between terminals 56a and 56c of the coding unit at station O to complete a stick circuit for relay M, which can be traced from terminal BX over front contact 1f of relay LBP, wire 55, connector 56, wire 57, front contact 1f and winding of relay M and to terminal CX.

The picking up of relay I, opening its back contact 3b, interrupts the original pick-up circuit for the transmitter relay OT, but in order to provide a long first code element the relay OT is provided with a stick circuit by means of a connector 53 placed between the terminals 53a and 53c of the coding unit at station O. This stick circuit can be traced from the BX terminal over front contact 2f of relay OT, front contacts 6f of relay IL and 2f of relay LP in parallel, wire 52, connector 53, wire 54, front contact 3f of relay I, and thence as traced for the original pick-up circuit. When relay LP is deenergized due to the release of relay IL and is released at the end of its slow release period, opening its front contact 2f, the relay OT is deenergized and releases, closing the line circuit and causing line relay OR to pick up, terminating the first code element and starting the second code element. It follows that by means of the connector 53 the first code element is long, whereas if the connector 53 is omitted from the coding unit the relay OT is released immediately following the picking up of relay I and the first code element is short.

When line relay OR is picked up at the beginning of the second code element, a circuit is closed including front contact 1f of relay OR, front contact 2f of relay LBP, winding of relay IL and to the CX terminal, and the relay IL is reenergized. The picking up of relay OR, opening its back contact 1b, deenergizes the relay 2L, and that relay releases at the end of its slow release period, which is of the order of one-fifth of a second. During the interval the two relays IL and 2L are both picked up, the repeater relay LP is reenergized and picked up the same as before, and the relay LB is provided with a new energizing impulse so that relays LB and LBP are retained picked up. Relay I of the chain of relays is deenergized in response to the picking up of relay OR, but remains picked up temporarily due to the continued flow of current through its winding and the asymmetric unit included in its stick circuit. Before relay I releases the relay 2 is energized over a pick-up circuit which includes BX terminal, front contact 1f of relay OR, front contact 5f of relay LBP, back contact 2b of relay 10, front contact 2f of relay I, winding of relay 2 and to the CX terminal, and relay 2 is picked up and is then retained energized over a stick circuit including back contact 2b of relay 3 and its own front contact 2f. Relay 2, at its back contact 1b, opens the stick circuit for relay I which now releases quickly. With relay I released, closing its back contact 3b, the original pick-up circuit for relay OT is closed, but relay OT does not pick up at once due to the fact that its winding is short-circuited by virtue of a path extending from terminal BX over front contact 2f of relay A of the unit DU since relay A was selected by operation of push button D1, wire 58, front contact 3f of relay 2, front contact 6f of relay M, front contact 3f of relay LP, back contact 3b of relay OT and to the left-hand terminal of the winding of relay OT. It is to be noted that the resistance 51 is effective to prevent this short-circuit path from short-circuiting the current source. When the relay LP is deenergized due to the release of relay 2L and is released at the end of its slow release period, opening its front contact 3f, this shunt path provided for the relay OT is removed and relay OT picks up to open the line circuit and cause the release of relay OR and thereby terminate the second code element and start the third code element, the second code element being a long element due to the fact that relay A is picked up to provide a short-circuiting path for the winding of relay OT.

When relay OR is released at the beginning of the third code element, the relay 2L is reenergized over the back contact 1b of relay OR and front contact 2f of relay IL, and is then retained energized over its own front contact 2f. Relay IL is now deenergized and releases at the end of its slow release period, but, during the interval both relays IL and 2L are picked up, the relay LP is provided with an energizing impulse and picks up, and in turn the relays LB and LBP are retained energized. With relay OR released, the stick circuit for the relay 2 is opened at the front contact 1f of relay OR, but before relay 2 releases, the relay 3 of the chain is picked up over a circuit including back contact 1b of relay OR, front contact 4f of relay LBP, back contact 1b of relay I, front contact 1f of relay 2, winding of relay 3 and to the CX terminal, and relay 3 on picking up closes its stick circuit including the back contact 1b of relay 4 and its own front contact 1f, relay 2 being released upon the opening of back contact 2b or relay 3. When relay 3 picks up, the original pick-up circuit for relay OT is opened at the back contact 3b of relay 3, but relay OT is retained energized over its stick circuit which is now completed from BX terminal over front contact 2f of relay OT, front contact 2f of relay LP, wire 59, front contact 2f of relay B" since relay B was picked up in response to operation of push button DI", wire 60, front contact 3f of relay 3, and thence over the original pick-up circuit for relay OT. When, subsequent to release of relay 1L, relay LP releases, opening its front contact 2f, this stick circuit for relay OT is opened and relay OT is deenergized and releases to close the line circuit and cause relay OR to be picked up and thereby end the third code element and start the fourth code element. This third code element is long due to the fact that the relay B in the designation setting unit DU is picked up.

When relay OR is picked up at the beginning of the fourth code element, relay 1L is reenergized over the front contact 1f of relay OR and the front contact 2f of relay LBP. Relay 2L is now deenergized and releases at the end of its slow release period. During the interval the two relays 1L and 2L are picked up, the relay LP is reenergized and picks up, and relay LB is again energized, so that relay LBP remains energized. Relay 3 of the relay chain is now deenergized, but before relay 3 releases the relay 4 of the relay chain is energized over BX terminal, front contact 1f of relay OR, front contact 5f of relay LBP, back contact 2b of relay 2, front contact 2f of relay 3, winding of relay 4 and to the CX terminal, and relay 4, on picking up, completes its stick circuit including back contact 2b of relay 5 and its own front contact 2f, and by opening its back contact 1b releases relay 3. When relay 3 is released, closing its back contact 3b, the original pick-up circuit for relay OT is completed, and that relay is at once picked up since there is provided no short circuit for the winding of relay OT inasmuch as the relay C of the code setting relays is released. With relay OT picking up, the line circuit is again opened and line relay OR deenergized and released to terminate the fourth code element, and to start the fifth code element, the fourth element being short.

When relay OR is released at the beginning of the fifth code element, the relay 2L is energized over the circuit completed at the front contact 2f of relay 1L, and relay 1L is deenergized and releases at the end of its slow release period. Although relay LP did not release during the short fourth code element, it is supplied with an energizing impulse during the interval relays 1L and 2L are both picked up, and in turn the relays LB and LBP are retained energized. With relay OR released, the relay 4 of the relay chain is deenergized, but before relay 4 releases the relay 5 is energized and picked up over a circuit extending from terminal BX, back contact 1b of relay OR, front contact 4f of relay LBP, back contact 1b of relay 3, front contact 1f of relay 4, winding of relay 5 and to terminal CX, and relay 5, on picking up, completes its stick circuit including back contact 1b of relay 6 and its own front contact 1f, and by opening its back contact 2b releases relay 4. When relay 5 is picked up, the original energizing circuit for relay OT is opened at back contact 3b of relay 5. Relay OT is retained energized, however, by virtue of its stick circuit now completed over its own front contact 2f, front contact 2f of relay LP, wire 59, front contact 2f of relay D of unit DU since relay D was picked up in response to operation of push button DI, wire 61, front contact 3f of relay 5 and thence over the original pick-up circuit for relay OT. When the relay LP releases, this stick circuit is opened and the relay OT at once releases to close the line circuit and reenergize line relay OR, which picks up and terminates the fifth code element and start the sixth code element. Thus, the fifth code element is long due to the fact that the code setting relay D was selected.

When relay OR is picked up at the beginning of the sixth code element, the relay 1L is reenergized and the relay 2L becomes deenergized in a manner explained hereinbefore, and the relays LP, LB and LBP remain energized. With relay OR picked up, the relay 5 of the relay chain is deenergized, but before relay 5 is released the relay 6 is picked up over a circuit including front contact 1f of relay OR, front contact 5f of relay LBP, back contact 2b of relay 4, front contact 2f of relay 5, winding of relay 6 and to terminal CX, and relay 6, on picking up, completes its stick circuit including back contact 2b of relay 7 and its own front contact 2f, and by opening its back contact 1b, releases relay 5. When relay 5 releases, closing its back contact 3b, the original pick-up circuit for relay OT is completed and relay OT is at once picked up to open the line circuit before relay 2L releases, since there is no shunt path completed around the winding of relay OT due to the fact that the relay E of the code setting relays is down. Thus, the sixth code element is short.

When relay OR is released at the beginning of the seventh code element, the relay 2L is reenergized, relay 1L is deenergized and, as before, the relays LP, LB and LBP remain energized. With relay OR released, the relay 6 of the relay chain is deenergized, but before relay 6 releases the relay 7 is energized over a circuit including back contact 1b of relay OR, front contact 4f of relay LBP, back contact 1b of relay 5, front contact 1f of relay 6, winding of relay 7 and terminal CX, and relay 7, on picking up, completes its stick circuit including back contact 1b of relay 8 and its own front contact 1f, and by opening its back contact 2b releases relay 6. When relay 7 picks up, opening its back contact 3b, the original pick-up circuit for relay OT is opened and relay OT is at once released to close the line circuit and pick up relay OR, since there is no stick circuit provided due to the fact that the relay F of unit DU is down. The seventh code element is therefore short.

When relay OR is picked up at the beginning of the eighth code element, the relay 1L is reenergized and the relay 2L is deenergized, relays LP, LB and LBP being held energized as before. Relay 7 is now deenergized and prior to the release of relay 7, relay 8 is picked up by virtue of a circuit completed over front contact 1f of relay OR, front contact 5f of relay LBP, back contact 2b of relay 6, front contact 2f of relay 7, winding of relay 8 and terminal CX, and relay 8, on picking up, is retained energized over its stick circuit including back contact 2b of relay 9 and its own front contact 2f. Relay 8, by opening its back contact 1b, releases relay 7. With relay 8 picked up, the original pick-up circuit for transmitter relay OT is held open at back contact 3b of relay 8, and relay OT remains deenergized and the line circuit closed, so that the sending of the code signal by relay OT is stopped at this point. Following the picking up of the line relay OR at the eighth code element, the slow acting relays 1L, 2L, LP, LB and LBP at station O start to release one at a time and in the event a return indication is not received promptly from station P, will return to their normal positions. The manner whereby the apparatus at station O functions to receive a return indication code element subsequent to the sending of the code signal and prior to the release of the slow acting relays will be taken up later.

It follows from the foregoing description that operation of the push button D1 at station O results in the apparatus at station O sending out a code signal of eight elements of which the first, second, third and fifth are long, the fourth, sixth and seventh are short, and the eighth element constituting the return of the line circuit to its normally closed condition functions to terminate the code signal. The first element is made long due to the connectors 53 and 56 provided for the coding unit at station O, and the second, third and fourth elements are long due to the selection of the code setting relays A, B and D.

I shall next trace, in step-by-step fashion, the operation of the apparatus at station P in receiving this code signal sent out from station O in a manner set forth above. In so doing, Figs. 2 and 4 will be specifically referred to, it being recalled that the apparatus at the two stations is substantially alike. In Fig. 2, the transmitting relay T is provided with two reference characters OT and PT, and the line relay R is provided with two reference characters OR and PR, since, in describing the sending of a code signal from station O, the coding unit CU was referred to as being associated with relays OT and OR of station O, and in describing the reception of the code signal at station P the coding unit CU of Fig. 2 will be referred to as being located at station P and associated with the relays PT and PR. At the start, the relays of units CU and SU at station P are in the normal position, that is, in the position illustrated in Figs. 2 and 4. In this code to be received, it is to be observed that the first, second, third and fifth elements are long, and the fourth, sixth and seventh are short.

When the line circuit is opened during the first code element, the line relay PR at station P becomes deenergized and releases to complete a circuit from terminal BX, back contact 1b of relay PR, back contact 3b of relay LBP, back contact 4b of relay 2L, back contact 2b of relay LBP, winding of relay 1L and to the CX terminal, and relay 1L is picked up. Relay 1L, on picking up, completes a circuit from BX terminal over back contact 1b of relay PR, front contact 2f of relay 1L, winding of relay 2L and to the CX terminal, and relay 2L is picked up. Relay 1L is now deenergized and releases at the end of its slow release period. During the interval both relays 1L and 2L are picked up, the relays LP, LB and LBP of station P become energized in the same manner as described for the corresponding relays at station O during the sending of a code signal from station O and the description need not be repeated. The relay 1 of the chain of relays at station P is picked up over a circuit closed by the release of the relay PR, which circuit includes terminal BX, back contact 1b of relay PR, back contact 4b of relay LBP, front contact 5f of relay 1L, winding of relay 1 and to the CX terminal. Subsequent to the picking up of relay LBP, the relay 1 is retained energized over the stick circuit including front contact 4f of relay LBP, back contact 1b of relay 2, front contact 1f of relay 1, winding of relay 1 and to the CX terminal. This condition remains during the long first code element, except for the fact that the relay LP of station P may release, but this operation of relay LP performs no useful function at this time.

When the line circuit is closed and line relay PR picked up at the start of the second code element sent from station O, the closing of front contact 1f of relay PR completes a circuit for energizing relay 1L, over front contact 2f of relay LBP, since relay LBP is now picked up. Relay 2L is deenergized and releases, but prior to the release of relay 2L relay LP is energized so that relays LB and LBP remain energized. Relay 1 is now deenergized, but prior to the release of relay 1 the relay 2 is picked up over a circuit including front contact 1f of relay PR, front contact 5f of relay LBP, back contact 2b of relay 10, front contact 2f of relay 1, winding of relay 2 and to the CX terminal, and relay 2, on picking up, is retained energized by virtue of its stick circuit completed over back contact 2b of relay 3 and its own front contact 2f. This second code element is long and relay 2L is released during the second element, and with relay 2L released a circuit is completed from BX terminal over front contact 6f of relay LBP, back contact 7b of relay M since relay M at station P is down, back contact 6b of relay 2L, front contact 4f of relay 2, wire 62, winding of relay 4A of the storage unit SU, back contact 4b of relay X1 and to the CX terminal, and relay 4A of the storage unit is picked up, and then is retained energized by virtue of a stick circuit completed over the back contact 2b of the corresponding relay 3A of the next preceding row of storage relays.

When relay PR is released at the beginning of the third code element sent from station O, relays 2L and LP are energized and the relay 1L is deenergized in the manner previously explained, with the result that the remaining slow acting relays LB and LBP remain energized. When relay PR is released, the stick circuit for the relay 2 is opened, but before relay 2 is released the relay 3 is picked up by virtue of the circuit completed at back contact 1b of relay PR, front contact 4f of relay LBP, back contact 1b of relay 1, front contact 1f of relay 2, winding of relay 3 and to the terminal CX, and relay 3 is then retained energized over its stick circuit including back contact 1b of relay 4 and its own front contact 1f. The third code element is long and relay 1L is released prior to the end of the third element. With relay 1L released, a circuit is completed from BX terminal over front contact 6f of relay LBP, back contact 7b of relay M, back contact 7b of relay 1L, front contact 4f of relay 3, wire 63, winding of relay 4B of the storage unit SU, back contact 4b of relay X1 and to terminal CX, and relay 4B is picked up and retained energized by its stick circuit including back contact 2b of the relay 3B of the next preceding row of storage relays.

When relay PR is picked up at the beginning of the fourth code element sent from station O, the relay 1L is energized and relay 2L is deenergized, and the remaining slow acting relays are operated in the usual manner. Relay 3 is now deenergized and during its release period the relay 4 is picked up by virtue of a circuit completed at front contact 1f of relay PR, front contact 5f of relay LBP, back contact 2b of relay 2, front contact 2f of relay 3, winding of relay 4 and to CX terminal, and relay 4, on picking up, is retained energized over its stick circuit including back contact 2b of relay 5 and its own front contact 2f. The fourth code element is short, and hence relay PR is released to start the fifth code element before relay 2L is released and relay 4C of the storage unit SU is not selected due to the fact that the circuit for relay 4C is held open at the back contacts 6b of relay 2L after being prepared by the closing of the front contact 4f of relay 4.

When relay PR is released at the start of the fifth code element sent from station O, the relay 2L is again energized, relay 1L is deenergized and relays LP, LB and LBP are retained picked up. Relay 4 of the chain is now deenergized due to the opening of the front contact 1f of relay PR, and prior to the release of relay 4 the relay 5 is energized by virtue of the circuit completed at back contact 1b of relay PR, front contact 4f of relay LBP, back contact 1b of relay 3, front contact 1f of relay 4 and winding of relay 5 to the CX terminal, and relay 5 is then retained energized over its stick circuit as previously described. The fifth code element is long and relay 1L is released prior to the end of the fifth element and a circuit is completed over front contact 6f of relay LBP, back contact 7b of relay M, back contact 7b of relay 1L, front contact 4f of relay 5, wire 64, winding of relay 4D of the storage unit, back contact 4b of relay X1 and terminal CX, and relay 4D is picked up and retained energized by its stick circuit including back contact 2b of relay 3D of the next preceding row of storage relays.

At the beginning of the sixth code element, relay PR is picked up and again energizes the relay 1L and deenergizes relay 2L. Relay 5 of the chain is now deenergized and during its slow release period the relay 6 is picked up by virtue of the circuit completed at front contact 1f of relay PR, front contact 5f of relay LBP, back contact 2b of relay 4, front contact 2f of relay 5, winding of relay 6 and to the terminal CX, and relay 6 is then retained energized by its stick circuit. The sixth element is short and relay PR is released to terminate the sixth code element before the relay 2L releases, and hence the relay 4E of the storage unit is not selected.

At the beginning of the seventh code element, the relay PR is released and relay 2L is reenergized and relay 1L deenergized. Relay 6 is now deenergized, but prior to its release the relay 7 is energized by virtue of the circuit completed at back contact 1b of relay PR, front contact 4f of relay LBP, and relay 7, on picking up, is then retained energized by the usual stick circuit. The seventh code element is short and relay PR is picked up prior to the release of relay 1L, and the relay 4F of the storage unit is not selected.

At the beginning of the eighth code element, the relay PR is picked up and the relays 1L and 2L are again operated. The relay 7 is now deenergized and the relay 8 picked up by virtue of the circuit completed at front contact 1f of relay PR, front contact 5f of relay LBP, and relay 8 is then retained energized by the usual stick circuit. It is to be seen, therefore, that relays 4A, 4B and 4D of the last row of storage relays of the unit SU at station P are selected and held energized by stick circuits by virtue of this code signal transmitted from station O to station P.

I shall next trace, in step-by-step fashion, the circuits by virtue of which the apparatus at station P functions to send a return or indication code element at the completion of reception of the code signal and also the manner in which such return code element is received by the apparatus at station O. When relay 8 at station P is picked up at the beginning of the eighth code element, a circuit is closed for the lockout relay LOR at station P. This circuit can be traced from BX terminal over front contact 6f of relay 8, wire 65, winding of relay LOR, back contact 4b of relay GR, wire 66, front contacts 2f of the relays 4A, 4B and 4D, respectively (see Fig. 6), and to the CX terminal. With relay LOR picked up, a circuit is completed for the transmitter relay PT from BX terminal over front contact 1f of relay LOR, wire 67, front contact 4f of relay 8, back contact 5b of relay M, winding of relay PT, resistor 51 and to the CX terminal, and the relay PT is picked up to open the line circuit to initiate the return code element and cause the line relay PR at station P and the line relay OR at station O to be released. At station P, the release of relay PR causes an operation of the associated relays 2L and 1L, relay 2L being energized and relay 1L being deenergized. The other slow acting relays LP, LB and LBP at station P are also energized in the usual manner. Relay 8 at station P is now deenergized, but prior to the release of relay 8 the relay 9 is energized over a circuit from terminal BX over back contact 1b of relay PR, front contact 4f of relay LBP, back contact 1b of relay 7, front contact 1f of relay 8, winding of relay 9 and terminal CX, and relay 9, on picking up, is retained energized by its stick circuit. Relay 9, by opening its back contact 2b, releases relay 8. With relay 8 released, opening its front contact 4f, the circuit for the relay PT is opened and the transmitter relay PT is released to close the line circuit and cause the line relays PR and OR to be picked up, terminating the return code element. With relay PR picked up at the end of this return code element, the relays 1L and 2L at station P are again operated in the usual manner. Relay 9 is now deenergized, but prior to its release the relay 10 is picked up by virtue of the circuit completed at front contact 5f of relay LBP, and relay 10 is then retained energized by a stick circuit including back contact 2b of relay 1 and front contact 2f of relay 10, and by opening its back contact 1b, releases relay 9. With relay 10 at station P picked up, the operation is stopped and the associated slow acting relays 2L, LP, LB, LBP and 1L are released successively in that order and are thus returned to their normal positions, the relay 1L being the last relay to release, relay 10 being deenergized when relay LBP is released.

Considering now the operation of receiving this return code element at station O, when line relay OR is released at the start of this return code element, the relays 1L, LBP, LB, LP, M, 8, ST and CR at station O are all picked up, since a control code signal has just been sent from station O. Thus, with relay OR released, the associated relays 1L and 2L, as well as the associated relays LP, LB and LPB are operated in the usual manner. Relay 8 of station O is released and the associated relay 9 is picked up in the same manner as described in connection with the apparatus at station P. When relay OR is picked up at the end of the return code element, the associated relays 1L, 2L, LP, LB and LBP are operated and the relay 9 is deenergized and the relay 10 is picked up prior to the release of relay 9 in the same manner described in connection with the apparatus at station P. With relay 10 of station O picked up, the starting relay ST is deenergized, since the stick circuit by which relay ST has been held energized includes back contact 5b of relay 10. When relay ST at station O is released, the circuit for the lamp HO is opened at front contact 2f of relay ST, and the lamp HO is extinguished to indicate to the operator at station O that a return code element has been received.

It is to be noted that at station P the picking up of the relay LB at the start of the reception of the code signal completes a circuit that includes front contact 1f of relay LB, back contact 3b of relay M, wire 72, and an indication lamp 71, with the result that lamp 71 at station P is illuminated to indicate to the operator at station P that a code signal is being received. When line relay PR is picked up at the end of the return code element the operation is stopped, the associated slow acting relays return to their normal positions, as already described. At the completion of the reception of the code signal and the sending of the return code element, the release of relay LB at station P causes the lamp 71 of that station to be extinguished to indicate to the operator at station P that the operation has been completed.

The operating steps which follow actuation of any one of the other push buttons at station O are similar except for the fact that a different combination of the relays of the last storage row 4A to 4F of the storage unit SU at station P are selected in accordance with the selected code setting relays A to F at station O.

It is clear that in sending a code signal from station P to station O the operations following the actuation of one of the push buttons at station P function to select relays of the last storage row of relays of the unit SU at station O in a manner similar to that explained in connection with sending the code signal from station O to station P to select relays of the last relay row of unit SU at station P. There is, however, one difference in the operation when a code signal originates at station P. The coding unit CU at station P is not provided with connectors 53 and 56, as shown in Fig. 2, and the first code element of a code signal sent from station P is short, whereas the first code element of a code signal sent from station O is long. This arrangement establishes priority for station O in the event both operators attempt to initiate a code signal simultaneously.

If a code signal sent from station O in the manner explained hereinbefore fails to be completely received at station P and the relay 8 of the relay chain of the coding unit fails to pick up and relay LOR is not energized to initiate the sending of a return code element, the coding apparatus at each station starts to restore to its normal position with an unfinished code signal. Under such circumstances, the "hands off" lamp HO at station O remains illuminated, indicating to the operator at station O the non-completion of the code signal. Also, at station O, a circuit for the associated relay GR is completed during the interval between the release of relay LB and the release of relay LBP. This circuit involves terminal BX, front contact 6f of relay LBP, back contact 3b of relay LB, front contact 8f of relay M, back contact 5b of relay 8, back contact 4b of relay 9, back contact 4b of relay 10, wire 68, winding of relay GR, back contact 5b of relay XI and terminal CX, and relay GR is picked up. Relay GR is then held energized over a stick circuit including its own front contact 2f. With relay GR picked up, a simple circuit is closed for operating bell BL to sound a warning to the operator at station O of the failure. At station P, the restoring of coding apparatus with an incompleted code signal results in the relay GR of that station being picked up over a circuit involving terminal BX, front contact 6f of relay LBP, back contact 3b of relay LB, back contact 8b of relay M, wire 69, back contact 2b of the associated relay LOR, winding of relay GR, back contact 5b of relay XI and terminal CX, and relay GR is picked up to actuate the associated bell BL, calling the receiving operator's attention to the failure of the code signal. In response to such incomplete operation, the sending operator at station O would actuate his knockdown push button KD to reset the starting relay ST and the selected code setting relays A to F, and he would then operate a push button 70 (Fig. 4) to pick up the relay XI and deenergize relay GR to stop the sounding of the bell. At station P, the receiving operator would actuate his push button 70 to stop the sounding of the bell. With the apparatus thus reset, the operator at station O could again actuate the designation push button and resend the desired code signal.

In practicing the invention, the operator at station O would register each eastbound train as it leaves his station. To insure that each eastbound train is registered, the designation setting unit DU would preferably be interlocked with the wayside signal apparatus that governs traffic on the eastbound track. One manner wherein this interlocking may be effected is shown in Fig. 3. Looking at Fig. 3, the circuit for the starting relay ST includes front contact 2f of relay 76, which may be a track relay responsive to trains moving on track ET. A relay 77 is controlled over a simple pick-up circuit including front contact 5f of relay ST, and is also provided with a stick circuit including front contact 1f of relay 76. Relay 77 at its front contact 2f governs the signal control circuit for operating the wayside signal governing eastbound traffic leaving station O. Hence, the wayside signal cannot be cleared to permit an eastbound train to leave station O unless the operator has taken steps to register the train. At station P, the relay 76 would be responsive to trains moving on track WT and relay 77 would govern westbound wayside signals.

I shall next describe the operation of the relays of the storage unit SU to store and progress the train designations. By way of illustration, I shall describe the operation of the storage unit SU at station P in response to the registering of eastbound trains at station O. The first eastbound train registered will be considered as moving to the route IR, the relays 4A, 4B and 4D of the storage unit being picked up in response to the reception of the corresponding code signal sent from station O in the manner explained hereinbefore. Before proceeding further in the description of the relays of the storage unit, it should be noted that the transfer relay 4P of the last row of storage relays is normally energized over a pick-up circuit involving the back contacts 4b of relays 4A, 4B and 4C, respectively, back contacts 3b of relays 4D, 4E and 4F, respectively, winding of relay 4P, back contact 4b of relay XI and terminal CX. The transfer relays 3P, 2P and IP of the third, second and first storage rows of relays, respectively, are each also provided with pick-up circuits similar to that of relay 4P, as will be readily understood by an inspection of Fig. 4, except for the fact that the circuit for relay 3P is normally completed over back contact 1b of the other transfer relay 3PP for the third row, the circuit for transfer relay 2P is normally completed over back contact 1b of the other transfer relay 2PP of the second row, and the circuit for relay 1P is normally completed over the contacts 45 and 46 of the cancelling unit and the back contact 1b of the other transfer relay 1PP of the first row.

When the first code element sent from station O is received at station P and the relay LBP at station P is picked up, a stick circuit is completed for the transfer relay 4P so that relay 4P is retained energized during the reception of the code signal and the selecting of the relays 4A, 4B and 4D. This stick circuit can be traced from terminal BX over front contact 7f of relay LBP, wire 73, front contact 1f of relay 4P, winding of relay 4P and to the CX terminal over the back contact 4b of relay XI. It follows that the transfer relay 4P is retained energized until the code signal is completed and the relay LBP is restored to its normal position. Since the relay LOR at station P is picked up in response to complete reception of the code signal, the release of the transfer relay 4P at the completion of the code signal completes circuits for progressing the train designation stored in the fourth row to the next preceding row of relays. The circuit for relay 3A comprises terminal BX, front contact 4f of relay LOR, back contact 3b of relay 4P, wire 74, front contact 3f of relay 4A, front contact 10f of the transfer relay 3P, winding of relay 3A, back contact 1b of relay 3PP and terminal CX. A similar circuit branches from wire 74 over front contact 3f of relay 4B, front contact 9f of relay 3P, winding of relay 3B and back contact 1b of relay 3PP to the CX terminal, and the relay 3B is picked up. Also, a similar circuit branches from wire 74 over front contact 2f of relay 4D, front contact 7f of relay 3P, winding of relay 3D and back contact 1b of relay 3PP to the CX terminal, and relay 3D is picked up. Hence, progression is effected from relay 4A to relay 3A, from relay 4B to relay 3B and from relay 4D to relay 3D, the progressions taking place simultaneously.

When the relays 3A, 3B and 3D are picked up, a stick circuit is completed for each, which in each case includes the back contact 2b of the corresponding relay of the second row of storage relays. The relays 3A, 3B and 3D, on picking up, also open at their back contact 4b the normal energizing circuit for the associated transfer relay 3P, but relay 3P is retained energized over a stick circuit including the back contact 2b of the next succeeding transfer relay 4P. The picking up of relays 3A, 3B and 3D also open the stick circuits for the corresponding relays of the fourth row of storage relays, and the relays 4A, 4B and 4D of the fourth row are released to their normal positions, closing the normal pick-up circuit for the associated transfer relay 4P, and releasing relay LOR. With the relay 4P picked up, the next preceding transfer relay 3P is deenergized and releases and causes progression of the train designation from the selected relay group of the third row to the corresponding relay group of the second row. The circuit for the relay 2A involves terminal BX, back contact 3b of relay 3P, wire 75, front contact 3f of relay 3A, front contact 10f of relay 2P, winding of relay 2A, back contact 1b of relay 2PP and terminal CX. Similar circuits branch from wire 75 for relays 2B and 2D so that relays 2A, 2B and 2D are now picked up and are each then retained energized over a stick circuit completed at a back contact of the corresponding relay of the first row of storage relays. With relays 2A, 2B and 2D picked up, the corresponding group of relays 3A, 3B and 3D is deenergized and released so that the transfer relay 3P is picked up and in turn the transfer relay 2P deenergized. With the release of the transfer relay 2P, circuits are completed over back contact 3b of relay 2P and wire 78 for progressing the train designation from the selected relay group of the second row to the corresponding relay group of the first row, the operation being similar to that already described and it is thought it need not be repeated. With relays 1A, 1B and 1D picked up, they are each retained energized by a stick circuit which in each case involves the contacts 45 and 46 of the cancelling unit CB, and is controlled by the transfer relay 1PP in a manner to later appear. The transfer relay 1P is now deenergized and releases, while the transfer relay 2P is reenergized and picked up following the release of the storage relays of the second row. It is to be seen, therefore, that the train designation for the train to route 1R as first stored in the last and fourth row of relays of unit SU is automatically progressed and finally stored in the first row of relays. With the group of relays 1A, 1B and 1D energized, the circuit for the lamp 1R of the first row of lamps of indicator DI at station P is completed and the lamp is illuminated to indicate to the operator the first eastbound train approaching station P is to move to the route 1R.

I shall next assume that the operator at station O actuates the push button D2 to register a second eastbound train which is to move to route 2R and that the relays 4A, 4B and 4E of the last row of the storage unit SU at station P are selected in response to the corresponding code signal. Subsequent to the reception of this code signal, the transfer relay 4P of station P is released when the relay LBP is restored to its normal position to open its front contact 7f interposed in the stick circuit of relay 4P. The release of transfer relay 4P is followed by progression of the selected group of relays of the fourth row to the corresponding relay group of the third row in a manner similar to that described for progressing the first train designation from the fourth row of relays to the third row of relays and need not be repeated. In like manner, progression of the second designation is effected from the third row of relays to corresponding relays of the second row. When relays 2A and 2B are picked up, a stick circuit is provided for each, which involves front contacts of relays 1A and 1B of the first row since relays 1A and 1B are included in the first train designation. The stick circuit for relay 2A involves terminal BX, back contact 2b of relay 1P, front contact 2f of relay 1A, front contact 1f of relay 2A, winding of relay 2A and extends to the CX terminal over front contact 1f of relay 2PP, back contact 2b of relay 3PP, and back contact 3b of relay XI. The stick circuit for relay 2B is similar to that just traced for relay 2A and includes front contact 2f of relay 1B. When the relay 2D is picked up, it is retained energized over the stick circuit including back contact 2b of relay 1D since relay 1D is not included in the train designation stored in the first row. Since relay IP is down the progression of the second train designation is stopped at the second row, the relays 2A, 2B and 2D being energized. A circuit is now completed for the lamp 2R of the second row of lamps of indicator DI at station P (see Fig. 5), and this lamp is illuminated to indicate to the operator at station P that a second eastbound train moving to route 2R is approaching.

I shall next assume that the operator at station O registers a third eastbound train which is to move to route 18R and in so doing operates the push button D18. Push button D18, when actuated, selects the code setting relays C, D and E, with the result that the code signal transmitted is effective to select the group of relays 4C, 4D and 4E of the last row of relays of the storage unit SU at station P. With this code signal completed and transfer relay 4P released, progression is effected from the relays selected in the fourth row to corresponding relays of the third row in the manner explained in connection with the storing of the designation of the first and second eastbound trains. Since relay 2P is now down progression is stopped at the third row of relays. With relays 3C, 3D and 3E energized, the circuit for lamp 18R of the third row of lamps of indicator DI is completed, and this lamp is illuminated to display the designation of this third eastbound train approaching station P. When progression takes place from the fourth to the third row of relays, the relays of the fourth row are released and are restored to their normal condition ready to receive another code signal selection.

Assuming next that the operator at station O registers a fourth eastbound train which is moving to route 19R and operates push button D19, so that the code setting relays B, D and E are selected and the resultant code signal is effective to energize relays 4B, 4D and 4E of the storage unit at station P. Since transfer relay 3P is now released, no progression takes place and the selected relays of the fourth row remain energized to store the designation of this fourth train, and these relays hold relay LOR energized. Since only three rows of lamps are provided in indicator DI, the designation stored in the fourth row is not at this time displayed.

In the event the operator at station O attempts to register a fifth eastbound train, the transmission of the code signal is blocked and the bell BL at station O is sounded to warn the operator of this condition. When relay 1 at station P is picked up during the first code impulse of this fifth successive code signal, a circuit is completed for the transmitting relay PT, since transfer relay 4P at station P is now released. This circuit involves terminal BX, back contact 4b of relay 4P, wire 80, front contact 4f of relay 1, back contact 5b of relay M, winding of relay PT, resistor 51 and terminal CX. Relay PT is now picked up to hold the line circuit open so that the relays PR and OR remain released and stop further operation of the coding apparatus at the respective stations, and relays IL, LP, LB, LBP and I at each station release successively, relays 2L being held energized because the line circuit is now open. At station O the stick circuit for relay M is opened by relay LBP and relays M and OT release, and a circuit is closed for the relay GR during the interval the relay LB is released and the relay LBP is still picked up, which circuit includes front contact 6f of relay LBP, back contact 3b of relay LB, front contact 8f of relay M, back contacts 5b, 4b and 4b of relays 8, 9 and 10, respectively, wire 68, winding of relay GR and back contact 5b of relay X1, and relay GR, on picking up, completes a circuit for the bell BL. At station P, relay GR is not operated because relay LOR is now energized, but the transmitter relay PT is deenergized by relay 1 and releases, closing the line circuit, whereupon the apparatus restores to normal. In response to the operation of bell BL, the sending operator will operate key KD to release relay ST and cancel the stored description and will also operate key 70 to silence the bell. It follows that the operator at station O cannot register more than four trains with the apparatus as here illustrated. As stated hereinbefore, if the designations of more than four trains are required, the storage unit SU would be provided with additional rows of relays.

I shall next take up the operating steps effected when the designation stored in the first row of relays of unit SU at station P is cancelled in response to the first eastbound train arriving at station P, the designations stored in each of the successive rows of relays progressing to the next preceding row. When the first train arrives at station P, cancellation of the corresponding designation may be effected automatically through the means of contact 45 operated by a relay 79 responsive to the train on track ET at station P, or cancellation may be effected manually by the operator actuating the push button of the cancelling unit CB to open contact 46. When either contact 45 or 46 is opened, the connection to the common terminal CX for the circuits of relays 1A, 1B and 1D is opened and the relays are deenergized and released. With the relays of the first row restored to their normal position, the transfer relay 1P is picked up. With the transfer relay 1P picked up, circuits are completed for progressing the designation stored in the second row to corresponding relays of the first row in the manner explained hereinbefore. Immediately following such progression, the selected relays 2A, 2B and 2E of the second row are deenergized and released, closing the pick-up circuit for transfer relay 2P. With relay 2P picked up, circuits are closed to effect progression of the designation stored in the third row to corresponding relays of the second row. Immediately following such progression from the third row to the second row, the selected relays 3C, 3D and 3E of the third row are deenergized and released. When these relays of the third row are restored to their normal position, the circuit for transfer relay 3P is completed and that relay is picked up. With the picking up of relay 3P, circuits are closed for effecting progression of the designation stored in the fourth row to corresponding relays of the third row. With the relays of the fourth row restored to their normal position, the transfer relay 4P is picked up and relay LOR is released, and the relays of this fourth row are in a condition for receiving a new code signal.

It is apparent that when the designation stored in the second row of relays is advanced to corresponding relays of the first row, the lamp 2R of the second row of lamps of indicator DI is extinguished and lamp 2R of the first row is illuminated. Likewise, the lamp 18R of the third row of lamps of indicator DI is extinguished when the designation stored in the third row is advanced to the second row and the lamp 18R of the second row is illuminated. When the designation stored in the fourth row advances to corresponding relays of the third row, a circuit is completed for the lamp 19R of the third row of lamps of indicator DI and this lamp is illuminated to indicate the route of the third train approaching station P.

It is clear that cancellation of the stored designation for the next train to arrive at station P effects progression of the stored designations and indications in the manner explained above.

It is to be observed that in this progression of the storage unit each relay action is the result of making and breaking circuits, the time element being in no way involved. The designation stored in any one of the rows of relays cannot advance until the designation stored in the preceding row has been cancelled and cleared out, and any possibility of one designation overtaking the other is avoided. Failure of any one of the relays to pick up when it should stops progression and, due to a disagreement between two indicator lights on the same row of lamps, calls the operator's attention to this condition.

I shall now set forth, in step-by-step fashion, the results accomplished in response to the operator at station O actauting the push button D20 to effect the sending of a code signal for the twentieth or special designation. Assuming for the purpose of illustration that three train designations have been stored in the manner previously explained in the storage unit SU at station P and that the operator at station O finds that the third designation stored is not correct and desires to have it cancelled, and to do so operates the push button D20. When the push button D20 at station O is operated, the associated relay XC is picked up and is then retained energized over its stick circuit controlled by the starting relay ST. With relay XC picked up, the code setting relays A, B and C are selected so that the resulting code signal transmitted selects relays 4A, 4B and 4C of the storage unit SU at station P. Relays 4A, 4B and 4C, when picked up, complete a circuit for lamp CLO, and the lamp is illuminated to indicate to the operator at station P that the last received train designation is to be cancelled. Referring to Fig. 6, it is to be observed that relays 4A, 4B and 4C, when selected, do not complete a circuit for the associated relay LOR, and hence relay LOR at station P is not picked up to initiate a return code element. At station O, the relay XC is held energized by its stick circuit until the answer-back code element is received and the starting relay ST is deenergized in response to operation of relay 10. When relay 8 at station O is picked up during the eighth code element of this code signal, the line circuit remains closed, and consequently the slow-acting relays at station O start to release, and a circuit is completed from BX terminal over front contact 1f of relay XC, wire 81, front contact 1f of relay M, front contact 1f of relay 8, back contact 2b of relay LB, winding of relay LBP and terminal CX, and relay LBP is held energized, which in turn holds the relays M and 8 energized. Hence, resetting of the coding relays of station O is stopped at this point until the operator at station P takes some action to cancel this last designation. When the slow-acting relays at station P start to release during the eighth code element, the circuit for the associated relay GR including front contact 6f of relay LBP at station P is completed when back contact 3b of relay LB is closed and the relay GR is picked up to cause the sounding of the bell. The relay LBP at station P is also retained energized, since a special stick circuit is now closed from BX terminal over front contact 1f of relay GR, wire 82, front contact 1f of relay 8, back contact 2b of relay LB, winding of relay LBP and terminal CX. Hence, the two LBP relays, one at each station, are held energized until the operator at station P cancels the last train designation. In other words, the code signal transmitted prevents the coding relays at each station from fully resetting and the line circuit is held closed until the last train designation is cancelled. To cancel the last designation, the operator at station P actuates the push button 70 to pick up relay XI at station P, which relay is then retained energized over a stick circuit including front contact 6f of relay LBP, wire 83 and its own front contact 2f. When relay XI at station P is picked up, the common connection to terminal CX for the selected relay of the third row of relays is opened at back contact 3b of relay XI, since the transfer relay 3PP is now energized due to transfer relay 3P being down closing its 11b back contact. With the selected relays of the third row deenergized and restored to their normal position, the associated transfer relay 3P is picked up and the corresponding lamp of the third row of indicator DI is extinguished.

The answer-back code element is originated in response to such operation of relay XI at station P by virtue of a circuit completed for the transmitter relay PT, and which circuit can be traced from terminal BX over front contact 1f of relay XI, wire 67, front contact 4f of relay 8, back contact 5b of relay M, winding of relay PT, resistor 51 and terminal CX. With relay PT picked up, the line circuit is opened and the two line relays OR and PR are operated to effect the corresponding operations of the return code element, the operator at station O being informed of the cancelling of the last designation by the extinguishing of his lamp HO. With the last designation thus cancelled, the operator at station O is free to transmit a new code signal for registering the corresponding train.

This feature "cancellation of last designation stored" is effected by virtue of push button 70 and relay XI and by automatic selection of the last designation stored through the medium of transfer relays 1PP, 2PP and 3PP. Under normal conditions, the storage relays of a row of relays and the associated transfer relay P are provided with circuits that have a common connection to the CX terminal of the current source which includes the back contact 1b of the associated relay PP. For example, the relays 1A to 1F and the transfer relay 1P are provided with circuits having a common connection that includes back contact 1b of relay 1PP. When a designation is stored in the first row of relays and relay 1P is released, the relay 1PP is picked up and the common connection is transferred from back contact 1b of relay 1PP to front contact 1f of relay 1PP, back contacts 2b of each of the relays 2PP and 3PP, and back contact 3b of relay XI. Thus, if the push button 70 is operated and relay XI picked up in response to reception of "cancel-last-designation" signal, the selected relays of the first row are deenergized. If a designation is stored in each of the first and second rows of relays, the relay 2PP is picked up and relay 1PP is released. The common connection for the selected relays of the first row now includes back contact 1b of relay 1PP. The common connection for the selected relays of the second row includes front contact 1f of relay 2PP, back contact 2b of relay 3PP and back contact 3b of relay X1. It follows that operation of push button 70 to pick up relay X1 effects the release of the relays of the second row but not those of the first row. If a train designation is stored in each of the first, second and third rows of relays, then the relay 3PP is picked up and relays 1PP and 2PP are released. The common connection for the selected relays for the first and second rows are carried directly over 1b back contacts of 1PP and 2PP transfer relays, while the common connection of the selected relays of the third row includes front contact 1f of relay 3PP and the back contact 3b of relay X1. Thus, operation of relay X1 at this time is effective to release the relays of the third row but not of the second and first rows. The cancellation of the last designation stored may be effected automatically by providing a connection indicated by the dotted line 84 so that relay X1 is operated in response to the energizing of relays 4A, 4B and 4C of the fourth relay row.

To indicate the total number of designations stored, a series of lamps 1N, 2N and 3N are controlled by the transfer relays 1PP, 2PP and 3PP and a lamp 4N is controlled by transfer relay 4P. The lamp 1N is provided with a circuit including a front contact of relay 1PP, a back contact of each of the relays 2PP and 3PP and a front contact of relay 4P as will be clear from an inspection of Fig. 4, the contact of relay 4P being shown in the upper left-hand corner of unit SU. Hence, when a designation is stored in the first row of relays and relay 1PP is picked up, the lamp 1N is illuminated. Lamp 2N is provided with a circuit including a front contact of relay 2PP so that when a designation is stored in the second row of relays the lamp 2N is illuminated. Again, the lamp 3N is controlled by relay 3PP so that lamp 3N is illuminated when a designation is stored in the third row of relays. The circuit for lamp 4N includes back contact 5b of relay 4P, as shown in the upper left-hand portion of the storage unit, and hence lamp 4N is illuminated when a designation is stored in the fourth row of relays. The lamps 1N to 4N would be mounted to be visible to the operator and the particular lamp illuminated indicates the total number of designations stored and the total number of trains approaching.

The operating steps which follow the registering of westbound trains by the operator at station P are similar in all respects to those following the registering of eastbound trains by the operator at station O, except for the fact that the first code element sent from station P is short.

Although I have herein shown and described only one form of signaling systems embodying my invention, it is understood that various changes and modifications may be made therein within the scope of the appended claims without departing from the spirit and scope of my invention.

Having thus described my invention, what I claim is:

1. In a signal system, a series of storage relays, a series of transfer relays including one for each storage relay, a pick-up circuit for each transfer relay including a back contact of the associated storage relay, a stick circuit for each transfer relay except the last including its own front contact and a back contact of the next succeeding transfer relay, a pick-up circuit for each storage relay except the last including a front contact of the next succeeding storage relay and a back contact of the next succeeding transfer relay, a stick circuit for each storage relay except the first including its own front contact and a back contact of the next preceding storage relay, a control contact, a cancelling contact, a pick-up circuit for the last storage relay including said control contact, a stick circuit for the first storage relay including its own front contact and said cancelling contact, means for at times operating said control contact, other means for at times operating said cancelling contact, and signaling means selectively controlled by said storage relays.

2. In a signal system, a series of storage relays, a series of transfer relays including one for each storage relay, a pick-up circuit for each transfer relay including a back contact of the associated storage relay, a stick circuit for each transfer relay except the last including its own front contact and a back contact of the next succeeding transfer relay, a pick-up circuit for each storage relay except the last including a front contact of the next succeeding storage relay and a back contact of the next succeeding transfer relay as well as a front contact of the associated transfer relay, a stick circuit for each storage relay except the first including its own front contact and a back contact of the next preceding storage relay, a control contact, a cancelling contact, a pick-up circuit for the last storage relay including said control contact, a stick circuit for the first storage relay including its own front contact and said cancelling contact, means for at times operating said control contact, other means for at times operating said cancelling contact, and signaling means selectively controlled by said storage relays.

3. In a signal system, a series of storage relays, a series of transfer relays including one for each storage relay, a pick-up circuit for each transfer relay including a back contact of the associated storage relay, a stick circuit for each transfer relay except the last including its own front contact and a back contact of the next succeeding transfer relay, a pick-up circuit for each storage relay except the last including a front contact of the next succeeding storage relay and a back contact of the next succeeding transfer relay, a stick circuit for each storage relay except the first including its own front contact and a back contact of the next preceding storage relay, another stick circuit for each storage relay except the first including its own front contact and a front contact of the next preceding storage relay as well as a back contact of the next preceding transfer relay, a control contact, a cancelling contact, a pick-up circuit for the last storage relay including said control contact, a stick circuit for the first storage relay including its own front contact and said cancelling contact, means for at times operating said control contact, other means for at times operating said cancelling contact, and signaling means selectively controlled by said storage relays.

4. In a signaling system, a series of storage relays, a series of primary transfer relays one for each storage relay, a series of secondary transfer relays one for each storage relay except the last, a pick-up circuit for each primary transfer relay including a back contact of the associated storage relay, a stick circuit for each primary transfer relay except the last including its own front contact and a back contact of the next succeeding primary transfer relay, a pick-up circuit for each secondary transfer relay including a back contact of the associated primary transfer relay, a pick-up circuit for each storage relay except the last including a front contact of the next succeeding storage relay and a back contact of the next succeeding primary transfer relay as well as a back contact of the associated secondary transfer relay, a stick circuit for each storage relay except the first including its own front contact and a back contact of the preceding storage relay as well as a front contact of the associated secondary transfer relay and a normally closed cancelling contact, a control contact, another cancelling contact, a pick-up circuit for the last storage relay including said control contact, a stick circuit for the first storage relay including its own front contact and said other cancelling contact as well as a front contact of the associated secondary transfer relay, remote controlled means for operating said control contact, means for at times operating said other cancelling contact, and other means for at times operating said first mentioned cancelling contact.

5. In a signal system, a series of storage relays, a series of primary transfer relays including one for each storage relay, a series of secondary transfer relays including one for each storage relay except the last, a pick-up circuit for each primary transfer relay including a back contact of the associated storage relay, a stick circuit for each primary transfer relay except the last including its own front contact and a back contact of the next succeeding primary transfer relay, a pick-up circuit for each secondary transfer relay including a back contact of the associated primary transfer relay, a pick-up circuit for each storage relay except the last including a front contact of the next succeeding storage relay and a back contact of the next succeeding primary transfer relay, a stick circuit for each storage relay except the first including its own front contact and a back contact of the next preceding storage relay as well as a front contact of the associated secondary transfer relay, a control contact, a cancelling contact, a pick-up circuit for the last storage relay including said control contact, a stick circuit for the first storage relay including its own front contact and said cancelling contact as well as a front contact of the associated secondary transfer relay, means for at times operating said control contact, other means for at times operating said cancelling contact, a first group of signal lamps controlled by a predetermined number of the storage relays beginning with the first, and another group of signal lamps controlled one by each secondary transfer relay and one by the last primary transfer relay.

6. In a signal system, a series of storage relays, a series of transfer relays including one for each storage relay, an energizing circuit for each transfer relay closed only when the associated storage relay is released, a holding circuit for each transfer relay except the last closed only when the next succeeding transfer relay is released, an energizing circuit for each storage relay except the last closed only when the next succeeding storage relay is picked up and the next succeeding transfer relay is released, a holding circuit for each storage relay except the first closed only when the next preceding storage relay is released, a control contact, a cancelling contact, an energizing circuit for the last storage relay closed only when said control contact is closed, a holding circuit for the first storage relay closed only when the cancelling contact is closed, means for at times closing said control contact, other means for at times opening said cancelling contact, and a signal device controlled by each of the storage relays of the series.

7. In a signaling system, a first and a second row of storage relays each row including a corresponding number of relays, a first and a second transfer relay for the first and second rows of storage relays respectively, a pick-up circuit for each transfer relay including a back contact of each storage relay of its row, a stick circuit for the first transfer relay including a back contact of the second transfer relay, a pick-up circuit for each storage relay of the first row including a front contact of the first transfer relay and a front contact of the corresponding storage relay of the first row, a stick circuit for each storage relay of the first row including a normally closed cancelling contact which is common to all, a pick-up circuit for each storage relay of the second row, a stick circuit for each storage relay of the second row including a front contact of the corresponding relay of the first row and a back contact of the first transfer relay, means to complete a selected one of the pick-up circuits of the second row of storage relays in response to each of a first and a second code signal to register such signals by leaving energized a corresponding storage relay of the first and second rows respectively, a first and a second signaling device governed by the first and second rows of storage relays respectively, and means for at times operating said cancelling contact.

8. In a signaling system, a series of relay rows each including a like number of corresponding storage relays, a series of transfer relays one for each relay row, a pick-up circuit for each transfer relay closed only when all the storage relays of its row are released, a stick circuit for each transfer relay except the last closed only when the next succeeding transfer relay is released, means effective when a storage relay of any row is picked up and its associated transfer relay is released to energize the corresponding storage relay of the next preceding row, a stick circuit for each storage relay except the relays of the first row closed only when the corresponding storage relay of the next preceding row is picked up and the transfer relay of the next preceding row is released, a stick circuit for each storage relay of the first row including a normally closed concelling contact common to all, registering means operative to supply in succession a plurality of different code signals with each signal effective to pick up a selected combination of the storage relays of the last row for sequentially storing the signals one in each row starting with the first row by leaving picked up in the respective rows the selected combinations of storage relays, a signaling device for each relay row having a distinctive indication for each code signal, circuits controlled by each relay row to cause its signaling device to display the indicaton corresponding to the combination of storage relays picked up, and means for at times operating the cancelling contact to cancel the signal stored in the first relay row and cause progression of each of the remaining stored signals each to the next preceding row.

9. In a signaling system, a series of rows of relays at a receiving station, means for energizing selected relays of the last row of said series in different combinations, means effective when selected relays of said last row are energized and all the relays of one or more of the preceding rows of the series are deenergized for successively energizing corresponding relays in each preceding row in turn until a row is reached in which the selected relays are held energized until the relays of the next preceding row become deenergized, means for releasing the relays of the first row, means for automatically releasing the relays of each row except the first when corresponding relays of the next preceding row become energized, a series of lamps including one lamp for each row of relays, and means for selectively lighting said lamps one at a time to indicate in how many rows, combinations of relays are energized.

10. In a signaling system, a series of rows of relays at a receiving station, means for energizing selected relays of the last row of said series in different combinations, means effective when selected relays of said last row are energized and all the relays of one or more of the preceding rows of the series are deenergized for successively energizing corresponding relays in each preceding row in turn until a row is reached in which the selected relays are held energized until the relays of the next preceding row become deenergized, means for releasing the relays of the first row, means for automatically releasing the relays of each row except the first when corresponding relays of the next preceding row become energized, means effective when a particular combination of the relays of the last row become energized to hold such relays energized without operation of corresponding relays of the next preceding row, and automatic cancelling means governed only by said particular combination of energized relays for releasing the relays of the last preceding row in which a combination of relays is energized and for also releasing the relays of said last row.

GEORGE A. CULBERTSON.